3,244,909
PULSE GENERATOR EMPLOYING PLURAL MONOSTABLE MULTIVIBRATORS PROVIDING VARIABLE WIDTH OUTPUT
William A. Henderson III, 13220 Superior St., Rockville, Md.
Filed Apr. 17, 1963, Ser. No. 273,644
4 Claims. (Cl. 307—88.5)

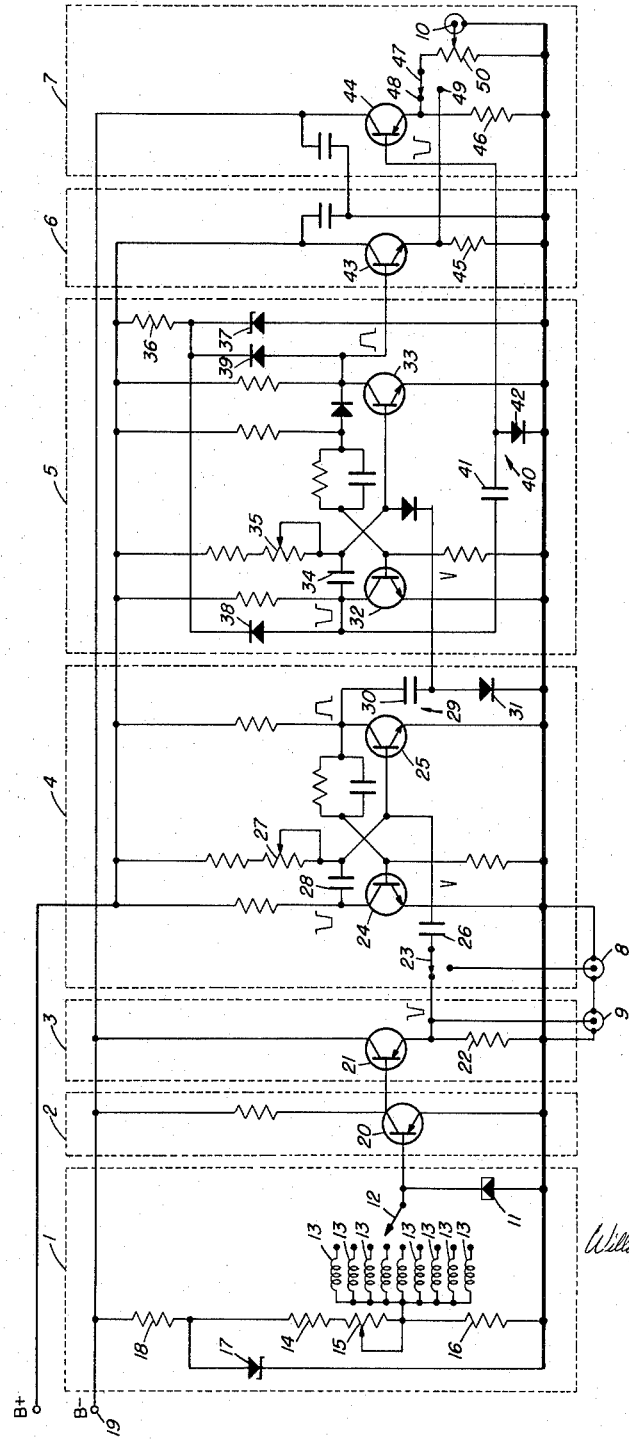
WILLIAM A.
HENDERSON
INVENTOR form
United States Patent Office 3,244,909
Patented Apr. 5, 1966

The present invention relates in general to pulse generators and in particular to an improved transistor, variable width pulse generating system of the type used in testing apparatus requiring the application thereto of one or more different pulse waveforms.

The complexity and high cost of manufacture of present day digital type systems practically precludes the testing of whole systems at one time or in one place. Instead, it has been found necessary to test each component of the system as it is developed. This means that the proper driving pulses for each component part of a complex digital system must be generated with the same characteristics and specifications as the components which generate the actual driving pulses in the system itself. Pulse generators have been developed for this particular use; however, to date, they have done little to relieve the original problem, since they have been for the most part bulky and expensive in themselves. The basic problem is compounded since in most component tests, several different driving pulses are required necessitating the duplication of already bulky and expensive equipment.

In addition to considerations of size and cost, the actual pulse generating characteristics of present day equipment is far from adequate for effective testing of certain digital systems. For one thing present day generators are characterized by the necessity for a wide range of adjustments, which seriously complicates the testing procedure. In addition, the response of these units as to pulse rise and fall times, pulse width range, pulse delay range and duty factor is less than required for some digital systems.

The present invention provides a transistorized pulse generator which solves all of the above-mentioned problems and in addition is highly flexible and useful with all types of existing test equipment.

It is an object of the present invention to provide a pulse generator of the type described which is very compact and inexpensive and adapted for use with fast pulse digital systems.

It is another object of the instant invention to provide a pulse generator of the type described which may be ganged to produce multiple pulse outputs without exceeding the size and cost of a single prior art generator.

It is a further object of the present invention to provide a pulse generator of the type described which has a duty factor of at least 80 percent.

It is another object of the present invention to provide a pulse generator of the type described which requires a minimum of adjustments for accurate operation.

It is still a further object of the invention to provide a pulse generator of the type described which has a pulse width range of 30 nanoseconds to 2.2 microseconds with a duty factor of at least 80 percent.

It is still another object of the present invention to provide a pulse generator of the type described having a pulse repetition frequency range of at least 100 kc. to 1 megacycle.

It is a further object of the invention to provide a pulse generator of the type described which contains means for internal or external triggering and which can easily be adjusted or tailored to operate at any desired pulse width and pulse repetition frequency range.

By virtue of these and more specific features, set forth with particularly in the claims annexed hereto, the invention provides extremely simple means for generating variable width test pulses with far superior characteristics to those heretofore attainable with the circuitry of much less simplicity. This will be more fully understood from the embodiment of a pulse generator according to the invention illustrated by way of example on the accompanying drawing in which the sole figure is a schematic circuit diagram of one embodiment of the instant invention.

The pulse generator according to the invention, one embodiment of which is illustrated in the figure, consists basically of a tunnel diode oscillator 1 and a pair of control multivibrators 4 and 5. The oscillator 1 together with a saturated amplifier 2 and an emitter follower stage 3 provide the basic frequencies available from within the generator. External triggering is also made possible through trigger input terminal 8. Thus, several generators may be synced together by extracting sync signals from an external sync output terminal 9 and applying them to the trigger input terminals 8 on the other units. Control multivibrator 4 driven by input sync pulses provides a control adjustment for various pulse delays with respect to these sync pulses. In this way the pulse delay can be matched to almost any required pulse timing sequence. Control multivibrator 5 provides pulse width adjustment, and because it is driven in coordination with multivibrator 4, a very high duty cycle can be achieved. A pair of fast rise time positive and negative pulses are derived from multivibrator 5 and applied to emitter follower stages 6 and 7, respectively, from which they are made selectively available to generator output terminal 10.

Looking more closely to the detailed arrangement and operation of the embodiment shown in the figure, the tunnel diode oscillator 1 consists of a standard tunnel diode 11 which is selectively connected through a single pole-multiple throw selector switch 12 and a plurality of chokes 13, the values of which vary according to the frequencies desired, to a resistor network which includes a resistor 14 in series with fine tuning resistor 15, resistor 16 and Zener diode 17. The resistor-choke combination receives power through a resistor 18 from power supply terminal 19. The Zener diode 17 serves to maintain the junction between resistors 14 and 18 at a fixed prescribed voltage level so as to ensure frequency stability in the oscillator. The frequency of the oscillator 1 is changed by connecting various chokes 13 to tunnel diode 11 by way of switch 12. Adjustment of resistor 14 provides for fine control of the frequency of the oscillator 1.

The voltage output from oscillator 1 is applied to the base electrode of transistor 20 which is connected as a saturated amplifier 2 and serves to greatly improve the rise time of the applied waveform. The output pulses from saturated amplifier 2 are passed on to emitter follower stage 3, which consists of transistor 21 and its load resistor 22. An output in the form of sync pulses can be extracted at this point by way of terminal 9, which is connected to the emitter of transistor 21.

The output of emitter follower stage 3 can be applied via single pole-double throw switch 23 to the control multivibrator 26 in control thereof, or the switch 23 may be connected to trigger input terminal 8 where outside sync pulses may be applied in control of the multivibrator 4.

The multivibrator 4 is a single shot monostable multivibrator having a pair of transistors 24 and 25 connected in the standard monostable configuration. The sync pulses from emitter follower 3 are applied to the base of transistor 25 via capacitor 26 which differentiates them providing negative spikes for triggering multivibrator 4 to conduction. The time delay of multivibrator 4 is determined by the values of capacitor 28 and variable resistor 27. Delays of up to 5 microseconds may be derived by adjustment of resistor 27.

A positive square wave pulse is derived at the collector of transistor 25 and applied to a differentiating network 29 consisting of a capacitor 30 and a diode 31. This network differentiates the output from multivibrator 4 on the trailing edge of each square wave pulse and applies a trigger pulse or spike to control multivibrator 5 in control thereof.

Control multivibrator 5 is a monostable multivibrator which includes a pair of transistors 32 and 33. The negative trigger derived from differentiating network 29 sets multivibrator 5 into conduction thereby providing coordinate action between the two multivibrators. The width of the output pulses from multivibrator 5 is controlled by the values of capacitor 34 and variable resistor 35. Pulse widths ranging from 30 nanoseconds to 2.2 microseconds are attainable through adjustment of resistor 35. A source of voltage from a regulated power supply is applied to multivibrator 5 through the series combination of resistor 36 and Zener diode 37. The Zener diode 37 is, in turn, connected to ground thereby clamping the collectors of transistors 32 and 33 to a fixed voltage level through diodes 38 and 39, respectively. This clamping action helps to improve the rise time of the output pulses and also serves to eliminate ringing.

A square wave pulse positive with respect to ground is derived from the collector of transistor 33 and a square wave pulse negative going from a positive level to ground is derived from the collector of transistor 32. In order to restore the D.C. level to the output of transistor 32, this signal is passed through a D.C. restoration circuit 40 which comprises a capacitor 41 and a diode 42. Multivibrator 5 thus provides positive and negative pulse outputs which are applied to transistors 43 and 44 in emitter follower circuits 6 and 7, respectively.

The outputs from emitter follower circuits 6 and 7 are taken across load resistors 45 and 46 and applied to terminals 48 and 49, respectively, on selector switch 47. With switch 47 connected to terminal 48, the negative pulse derived from emitter follower 7 is applied via amplitude adjusting potentiometer 50 to output terminal 10 and with switch 47 connected to terminal 49, the positive pulse output derived from emitter follower 6 is applied via potentiometer 50 to output terminal 10. Because of the isolation afforded by emitter followers 6 and 7, a standard 50 ohm load can be applied to output terminal 10 without appreciable change in output signal.

The unique combination described in conjunction with the figure has many advantages over similar type pulse generators. The simplicity of the circuits involved provides for a very compact and inexpensive unit which can be used in numbers to provide several different pulse outputs simultaneously. By using the sync output pulses from terminal 9 to drive other units through trigger input terminal 8, a plurality of synchronized output pulses can be obtained without generating serious space or cost problems.

In addition the duty factor obtainable with the combination described herein is superior to many generators presently available. The fast rise time available with the components used in conjunction with the unique control afforded by the combination make this high duty factor possible. The coordinate control of multivibrator 5 by multivibrator 4 makes possible the generation of pulses with almost no interpulse spacing. Such response is not attainable at all with vacuum tube circuits. Present pulse generators have a maximum duty factor of 50 percent whereas a duty factor of over 80 percent is attainable with the invention.

In a specific system constructed in accordance with the embodiment shown in the figure, the following component values were employed:

| | | |
|---|---|---|
| Diode 11 | | 1N2941 |
| Chokes 13 | microhenries | 10–20 |
| Resistor 14 | ohms | 180 |
| Resistor 15 | do | 200 |
| Resistor 16 | do | 10 |
| Diode 17 | | 1N762 |
| Resistor 18 | ohms | 510 |
| Transistor 20 | | 2N1195 |
| Transistor 21 | | 2N1195 |
| Resistor 22 | ohms | 330 |
| Transistor 24 | | 2N708 |
| Transistor 25 | | 2N708 |
| Capacitor 26 | picofarads | 680 |
| Resistor 27 | ohms | 25K. |
| Capacitor 28 | picofarads | 15 |
| Capacitor 30 | do | 390 |
| Diode 31 | | FD824 |
| Transistor 33 | | 2N708 |
| Transistor 33 | | 2N2368 |
| Capacitor 34 | picofarads | 15 |
| Resistor 35 | ohms | 10K. |
| Resistor 36 | do | 470 |
| Diode 37 | | 1N763 |
| Diode 38 | | FD824 |
| Diode 39 | | FD824 |
| Capacitor 41 | picofarads | .01 |
| Diode 42 | | FD824 |
| Transistor 43 | | 2N2368 |
| Transistor 44 | | 2N995 |
| Resistor 45 | ohms | 1K. |
| Resistor 46 | do | 1K. |
| Resistor 50 | do | 200 |

It should be evident from the foregoing specification that the invention as described in connection with the specific embodiment shown herein for illustration is susceptible of different variations and modifications differing from that illustrated and coming within the broad scope and spirit of the invention as defined in the appended claims.

I claim:

1. A transistorized fast pulse generator comprising oscillator means for selectively generating one of a plurality of stable frequencies having a square waveform, a first differentiating circuit connected to the output of said oscillator means for providing a narrow pulse control signal, a first monostable transistor multivibrator connected to said first differentiating circuit so as to be triggered by said narrow pulse control signal, means within said first multivibrator for selectively varying the delay time between each applied trigger pulse and the generated output pulse, a second differentiating circuit connected to said first multivibrator for converting the output thereof to a narrow control pulse, a second monostable transistor multivibrator connected to said second differentiating circuit so as to be triggered by said narrow control pulse, means within said second multivibrator for selectively varying the width of the output pulses derived therefrom, and transistor control means connected to said second multivibrator for providing a pair of output square wave signals of opposite polarity having selectively variable pulse spacing and pulse width.

2. A transistorized fast pulse generator as defined in claim 1 wherein said first differentiating circuit includes a first capacitor connected to the input of said first monostable transistor multivibrator and said second differentiating circuit consists of a second capacitor series-connected to a diode, the point of juncture of said second capacitor and said diode being connected to the input of said second monostable transistor multivibrator, said second capacitor being connected also to the output of said first monostable transistor multivibrator.

3. A transistorized fast pulse generator comprising a tunnel diode oscillator capable of generating a plurality of frequencies within a given range, a saturated amplifier connected to the output of said tunnel diode oscillator for improving the characteristics of the output waveform thereof, a first emitter follower amplifier connected to the output of said saturated amplifier, a first monostable transistor multivibrator having a selectively variable time delay incorporated therein, means connected to said emitter follower and said first multivibrator for differentiating the output of said emitter follower and for applying said differentiated output in control of said first multivibrator, a second monostable transistor multivibrator having a selectively variable pulse width output, means connected to said first and second multivibrators for differentiating the output of said first multivibrator and applying it in control of said second multivibrator, means for deriving first and second outputs of opposite polarity from said second multivibrator, an emitter follower amplifier connected to each of said first and second outputs and switch means selectively connected to each of said emitter followers thereby providing output pulses of positive and negative polarity which have controlled spacing and pulse width.

4. A transistorized fast pulse generator for providing digital type pulses of variable width and spacing comprising a tunnel diode oscillator capable of generating a plurality of frequencies within a given range, a saturated amplifier connected to the output of said tunnel diode oscillator for improving the characteristics of the output waveform thereof, a first emitter follower amplifier connected to the output of said saturated amplifier, a first differentiating circuit connected to the output of said emitter follower and providing a narrow pulse control signal, a first monostable transistor multivibrator connected to said first differentiating circuit so as to be triggered by said narrow pulse control signal, means within said first multivibrator for selectively varying the delay time between each applied trigger pulse and the generated output pulse, a second differentiating circuit connected to said first multivibrator for converting the output thereof to a narrow control pulse, a second monostable transistor multivibrator connected to said second differentiating circuit so as to be triggered by said narrow control pulse, means within said second multivibrator for selectively varying the width of the output pulses derived therefrom, means connected to said second multivibrator for providing a pair of output square wave signals of opposite polarity having selectively variable pulse spacing and pulse width and switch means connected between said first emitter follower and said first differentiating means for selectively applying external signals in control of said first multivibrator.

References Cited by the Examiner
UNITED STATES PATENTS

| | | | |
|---|---|---|---|
| 2,976,427 | 3/1961 | Armanini | 307—88.5 |
| 3,019,350 | 1/1962 | Gauthey | 307—88.5 |
| 3,085,165 | 3/1963 | Schaffert et al. | 307—88.5 |
| 3,102,978 | 9/1963 | Bossard | 307—88.5 X |

ARTHUR GAUSS, *Primary Examiner.*